United States Patent [19]

Kruger et al.

[11] 4,156,058

[45] May 22, 1979

[54] GALVANIC ELEMENT WITH NEGATIVE LIGHT METAL ELECTRODE AND NON-AQUEOUS ORGANIC ELECTROLYTE

[75] Inventors: Franz J. Kruger, Vockenhausen; Helmut Lauck, Glashütten, both of Fed. Rep. of Germany

[73] Assignee: Varta Batterie A.G., Hanover, Fed. Rep. of Germany

[21] Appl. No.: 906,968

[22] Filed: May 18, 1978

[30] Foreign Application Priority Data

May 26, 1977 [DE] Fed. Rep. of Germany ....... 2723772

[51] Int. Cl.$^2$ .............................................. H01M 6/14
[52] U.S. Cl. .................................... 429/194; 429/218
[58] Field of Search ......................... 429/194, 196–199, 429/218

[56] References Cited

U.S. PATENT DOCUMENTS

| 3,578,500 | 5/1971 | Maricle et al. ................. 429/194 X |
| 4,049,887 | 9/1977 | Whittinghem ................. 429/194 X |
| 4,060,674 | 11/1977 | Klemann .............................. 429/194 |

*Primary Examiner*—Charles F. LeFevour
*Attorney, Agent, or Firm*—Weiser, Stapler & Spivak

[57] ABSTRACT

A galvanic element with negative light metal electrode and non-aqueous electrolyte, and having active material which is an organic sulfohalogenide.

8 Claims, No Drawings

GALVANIC ELEMENT WITH NEGATIVE LIGHT METAL ELECTRODE AND NON-AQUEOUS ORGANIC ELECTROLYTE

The invention relates to a galvanic element having a negative light metal electrode and a non-aqueous organic electrolyte.

Galvanic elements are known having an electrolyte consisting of a metal salt and a non-aqueous solvent, in many different embodiments. In these it is always of the greatest interest to provide as high as possible an ionic conductivity of the electrolyte. However, the stability of the electrode material in the electrolyte liquid is also important if adequate shelf life of the element is to be assured.

In general, the electrolyte consists of the electrolyte salt itself and of its solvent, i.e. the electrolyte carrier. However, electrolytes are also known which consist of substances that function both as solvent for the electrolyte salt and also as the positive active material within the galvanic cell, because they possess oxidizing properties. For example, liquid sulfur dioxide, if appropriate dissolved in a neutral auxiliary solvent, may perform such a dual function as "cathode electrolyte".

In German patent publication (Offenlegungsschrift) No. 2,262,256, there is described the utilization of an entire spectrum of cathode electrolytes including thionyl chloride $SOCl_2$ and sulfuryl chloride $SO_2Cl_2$ in non-aqueous cells.

For these compounds which belong to the large group of oxyhalides, there are always involved inorganic substances which are liquid at the normal operating conditions of the coil (room temperature). This has advantages relative to the previously mentioned sulfur dioxide because the latter is gaseous at room temperature and has to be first liquefied or dissolved under pressure in the electrolyte before being used in electrochemical cells.

The cathode electrolyte is further subject to the requirement that it solubilizes the electrolyte salt well and thereby contributes to high ionic conductivity. Suitable for electrolyte salts are simple metal salts or complex salts of elements from Group IA, IIA or IIIA, e.g. $LiAlCl_4$.

Use of a cathode electrolyte in its dual function as solvent and cathode depolarizer requires introduction into the cell of a cathode collector made of an inert electron conductive material, e.g. graphite. In its second property as liquid electrolyte, the cathode depolarizer cannot be separated from the anode, as would be a solid cathode material. Therefore, there arises basically the possibility that the depolarizer immediately would react chemically directly with the highly active anode metal. However, with the above-mentioned oxyhalides reactive cathode depolarizers, it has been found that such reaction with the anode takes place only to a very limited extent, because of the high energy requirement or because of the formation of a cover layer on the anode surface. Of course this cover layer must have such an effect that it protects the anode metal just enough while not appreciably impeding the progress of the electrochemical reaction within the cell.

There remains in these known systems the drawback of a relatively high vapor pressure of the oxyhalides used, particularly at elevated operating temperatures. For example, the boiling points of thionyl chloride and phosphoryl chloride are 75.7° C. and 108° C. respectively. For that reason, special technologically demanding sealing arrangements for the cell are necessary.

Accordingly it is an object of the invention, and the invention provides an electrolyte which is non-aqueous, whose positive electrode material contributes to high energy density and, whenever liquid has low vapor density. The electrolyte of the invention is compatible with other non-aqueous electrolytes.

In accordance with the invention there is provided an electrolyte which comprises an organic sulfohalogenide, which is defined as a sulfonyl—$SO_2$—, halo-substituted hydrocarbon, wherein the halo group X may be a halogenaton selected from the group of chlorine, bromine, fluorine, and the hydrocarbon is an aliphatic or aromatic hydrocarbon, which can be acyclic (branched or straight) or cyclic aliphatic or aromatic wherein at least one hydrogen is substituted by $SO_2X$—, wherein X is defined above. The aliphatic hydrocarbons when acyclic may be halo-substituted. The compounds of the invention may be liquid or solid, at room temperature.

The sulfonyl-halo-substituted compounds of the invention may be grouped in the following three groups, 1. Acyclic hydrocarbons wherein at least one hydrogen is substituted by $SO_2$—X wherein X is defined above. Typical illustrative compounds are the following: methyl sulfochloride ($CH_3SO_2Cl$), ethyl sulfochloride ($C_2H_5SO_2Cl$), propyl sulfochloride ($C_3H_7SO_2Cl$), butyl sulfochloride ($C_4H_9SO_2Cl$) and other alkyl-$SO_2$—X wherein the alkyl group may have from 1 to 10 carbon atoms, preferably from 1 to 6 and X is defined above, and the respective position isomers.

2. The compounds of Group 1 above, which are halo-substituted, such as X—R—$SO_2X$ wherein R is preferably a lower alkylene such as methylene, isobutylene, butylene, etc. typically illustrated by the following: chloromethylsulfochloride ($ClCH_2SO_2Cl$), dichloromethylsulfochloride ($Cl_2CHSO_2Cl$), trichloromethylsulfochloride ($Cl_3CSO_2Cl$) and trichloromethylsulfofluoride ($Cl_3CSO_2F$).

3. Cyclic alkanes and aromatic hydrocarbons wherein at least one or more hydrocarbons are substituted by $SO_2$—X, wherein X is defined above, illustrative compounds are

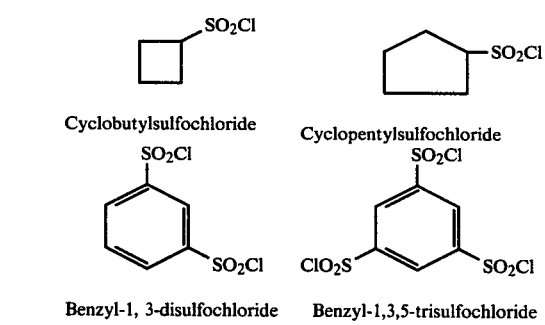

Cyclobutylsulfochloride  Cyclopentylsulfochloride

Benzyl-1, 3-disulfochloride  Benzyl-1,3,5-trisulfochloride

When the hydrocarbon is cyclic, it may have from 4 to 14, preferably from 6 to 10 carbon atoms, such as naphtyl, also alkyl-substitutes such as toluyl, or others.

Liquid compounds, as for example, $CH_3SO_2Cl$, $C_2H_5SO_2Cl$, $C_3H_7SO_2Cl$ and $ClCH_2SO_2Cl$ have boiling points between 160° C. and 180° C. They are therefore also useful even at elevated temperatures.

As appears from the following equation (1) for the discharge process, the sulfur atom yields during reduction a total of 6 charge equivalents so that high specific charge utilization of the positive electrode material is achieved.

$$R-SO_2Cl + 6\ Li \rightarrow R-S^{(-)}Li^{(+)} + 2\ Li_2O + LiCl \qquad (1)$$

This advantage applies to both liquid and solid.

Only a third of this charge utilization is obtained when thionyl chloride is used in place of the sulfohalogens of the invention and the discharge process is shown by the formula below:

$$2\ SOCl_2 + 4\ Li \rightarrow S + SO_2 + 4\ LiCl \qquad (2)$$

To liberate ions, the liquid organic cathode materials are reacted with a readily soluble conductive salt. The conductive salt must meet the requirement of being sufficiently dissociable and compatible with the electrolyte. As conductive salts there are preferably used alkali or alkaline earth metal salts as well as complex salts with metals from (the third and fifth principal groups) Group IIIA or VA of the Periodic Table of the Elements. Particularly suitable are lithium hexafluoro arsenate ($LiAsF_6$), lithium hexafluoro phosphate ($LiPF_6$), lithium tetrafluoro borate ($LiBF_4$), lithium perchlorate ($LiClO_4$), lithium hexachloro antimonate ($LiSbCl_6$), lithium hexafluoro antimonate ($LiSbF_6$), lithium tetrachloro aluminate ($LiAlCl_4$) and lithium bromide (LiBr).

To reduce the viscosity and enhance the conductivity, the electrolyte may be diluted in appropriate cases with a solvent. As solvent additives, there may be named propylene carbonate (PC), methylsulfolane (MS), glycol sulfite (GS), and their mixtures with ether, e.g. dimethyl ether or with tetrahydrofuran or with dioxane.

The solid cathode materials according to the invention are characterized by having solid organic components (designated by the generic letter R in the equation (1)) partly dissolved in the electrolyte and partly in combination with a conductive material such as graphite or carbon black present in the cathode in solid form. As organic solvents there may be named propylene carbonate, gamma-butyrolactone, methyl-sulfolane, glycol sulfite as well as their mixtures with ether as well as dimethyl ether or tetrahydrofuran or dioxane.

Mixtures of the compounds of the invention may be used also as cathode electrolytes.

The following examples are provided for further explanation of the invention; they are merely illustrative and non-limiting.

EXAMPLE I

A test cell was produced in which a lithium anode, a graphite cathode, and the electrolyte mixture were introduced into a glass container (10 cm$^3$). The anode consisted of a 0.5 mm thick lithium foil pressed upon a nickel expanded metal. The cathode was a mixture of 90% by weight of graphite and 10% by weight of PTFE, also applied to expanded metal. In each case the surface of the electrodes was 2.5 cm$^2$. The electrolyte was a 0.75 molar solution of $LiAlCl_4$ (lithium tetrachloroaluminate) in methyl sulfochloride ($CH_3SO_2Cl$). The electrolyte quantity amounted to 7 ml. The cell delivered at a load of 2 milliamperes 0.6 ampere hours. The average discharge voltage was 2.5 V and the open circuit voltage was 3.4 V.

The energy density of this glass test cell computes at 150 Wh/l and is therefore relatively low. A multiple thereof, namely 700 Wh/l, was achieved with a button cell of 11.6 mm diameter and 5.4 mm height based on the same electrochemical system. Only the methyl sulfochloride was diluted by half with propylene carbonate as solvent additive, the $LiAlCl_4$ concentration was 1 molar, the current load 0.1 mA.

An even higher energy density would be achieved with undiluted methyl sulfochloride in the button cell.

EXAMPLE II

A glass test cell according to Example I was filled with 7 ml of a 0.75 molar solution of $LiAlCl_4$ in chloromethylsulfochloride ($ClCH_2SO_2Cl$). The cell was loaded at 1 mA and delivered 1.5 ampere hours. The average discharge potential was 2.6 V and the open circuit voltage 3.4 V.

EXAMPLE III

A glass test cell according to Example I was filled with 4 ml of a 0.5 molar $LiAsF_6$ solution in ethyl sulfochloride ($C_2H_5SO_2Cl$) and 3 ml of a mixture of 70% be weight PC and 30% by weight dimethoxyethane (DME) which was 1 molar with respect to $LiAsF_6$. The cell delivered at a load of 2 milliamperes, 1 ampere hours; average discharge potential: 2.6 V, open circuit potential: 3.4 V.

EXAMPLE IV

The cathode of a glass cell according to Example I was produced from a mixture of 80% be weight trichloromethylsulfochloride ($Cl_3CSO_2Cl$), 10% by weight graphite and 10% by weight PTFE. The cell was filled with 7 ml. of a mixture of 70% by weight PC and 30% be weight DME which was 1.0 molar with respect to $LiAsF_6$. At a load of 2 mA the cell delivered 0.5 ampere hours; average discharge potential: 2.7 V, open circuit potential: 3.5 V.

EXAMPLE V

The cathode of a glass cell according to Example I was made of a mixture of 85% by weight 1.3 benzyldisulfonyl chloride, 10% by weight graphite and 5% by weight PTFE. The cell was filled with 7 ml. of a mixture of 70% by weight PC and 30% by weight tetrahydrofuran (THF), which was 1 molar with respect to $LiClO_4$. At a load of 1 mA the cell delivered 0.5 ampere hours; average discharge potential: 2.6 V, open circuit potential: 3.5 V.

We claim:

1. A galvanic element having a negative electrode comprising lithium, a non-aqueous, organic electrolyte comprising an organic solvent with a conductive salt dissolved therein and cathode electrolyte material functioning both as positive active material and as an organic solvent of the electrolyte, the said cathode electrolyte material being a sulfonyl-halo-hydrocarbon of the formula R—SO$_2$X, wherein R is a hydrocarbon wherein at least one hydrogen is substituted by —SO$_2$X, wherein X is a halogen, and wherein the hydrocarbon is an alkyl group which is cyclic or acyclic, a alkylene or an aryl group.

2. The element of claim 1 wherein the alkylene is halogen-substituted.

3. The element of claim 1 wherein the hydrocarbon is an alkyl—SO$_2$—X wherein the alkyl is lower alkyl.

4. The element of claim 1 wherein X is chlorine.

5. The element of claim 1 wherein the alkyl is methyl.

6. The element of claim 1 wherein the cathode electrolyte material is one of the following: methyl sulfochloride (CH₃SO₂Cl), ethyl sulfochloride (C₂H₅SO₂Cl), propyl sulfochloride (C₃H₇SO₂Cl) and butyl sulfochloride (C₄H₉SO₂Cl).

7. The element of claim 1 wherein the cathode electrolyte material is one of the following: chloromethylsulfochloride (ClCH₂SO₂Cl), dichloromethylsulfochloride (Cl₂CHSO₂Cl), trichloromethylsulfochloride (Cl₃CSO₂Cl) and trichloromethylsulfofluoride (Cl₃CSO₂F).

8. The element of claim 1 wherein the cathode electrolyte material is a cyclic hydrocarbon from the following:

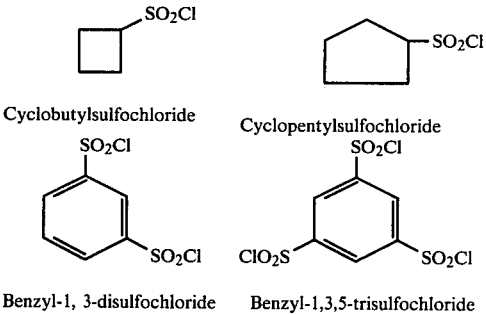

* * * * *